Dec. 14, 1965 W. A. FLORAC, JR., ETAL 3,223,925

DIGITAL DATA MODULATION DEVICE

Filed Jan. 29, 1962 4 Sheets-Sheet 1

INVENTORS
WILLIAM A. FLORAC, JR.
HANS Y. JULIUSBURGER
ARTHUR A. KUSNICK

BY Thomas & Crickenberger
ATTORNEYS

Dec. 14, 1965 W. A. FLORAC, JR., ETAL 3,223,925

DIGITAL DATA MODULATION DEVICE

Filed Jan. 29, 1962 4 Sheets-Sheet 3

3,223,925
Patented Dec. 14, 1965

3,223,925

DIGITAL DATA MODULATION DEVICE

William A. Florac, Jr., Carmel, Hans Y. Juliusburger, Ossining, and Arthur A. Kusnick, Peekskill, N.Y., assignors to International Business Machines Corporation, New York, N.Y., a corporation of New York Filed Jan. 29, 1962, Ser. No. 169,332
11 Claims. (Cl. 325—163)

This invention relates to Digital Data Modulation Devices and more particularly to such devices wherein frequency modulation is employed.

In earlier types of modulation devices different frequencies are transmitted for the purpose of representing different items of information. In some of the known types of earlier modulation devices utilizing two discrete frequencies to represent different items of information, a plurality of cycles of the selected frequency is employed to represent each item of information, and the two discrete frequencies in the output wave are not necessarily phased or joined to provide a smooth and continuous output wave. To the extent that a plurality of cycles of a selected frequency is employed to represent an item of information, there is a loss in efficiency in the use of time involved where one cycle of the selected frequency is adequate to represent the item of information. Furthermore, to the extent that the transmitted frequencies are not properly phased or joined to provide a smooth and continuous wave having no abrupt change in slope, there is a loss of band width.

For the purpose of overcoming these and other disadvantages of earlier types of modulation devices, there is provided according to this invention an improved modulation device which utilizes different frequencies to represent different items of information, and the plurality of waves employed is arranged so that a positive excursion is always followed by a negative excursion and vice versa for the purpose of insuring a smooth and continuous wave, thereby conserving band width. Furthermore, the time duration of each item of information or data cycle is limited to a period of time which is no longer than one cycle of the highest frequency employed. In the case where two frequencies are employed and one frequency is twice the other frequency, one-half cycle of the lowest frequency is used when it is selected during a data cycle. By this arrangement the time for transmitting a given item of information is reduced to a single cycle or a portion of a cycle, thereby increasing the data rate or speed of transmission over earlier modulation devices which utilized multiple cycles of the selected frequencies.

In one arrangement according to this invention a novel circuit is provided for transmitting different items of information as sine waves of different frequencies and for insuring a small band width for the resulting output signal by insuring that a positive excursion is always followed by a negative one and that a negative excursion is always followed by a positive one.

It is a feature of this invention to provide a novel modulation device which utilizes a single cycle or a portion of a single cycle to represent an item of information.

It is another feature of this invention to provide an improved modulation device having an output wave with a positive excursion always followed by a negative excursion and a negative excursion always followed by a positive excursion.

It is a further feature of this invention to provide an improved modulation device wherein different discrete frequencies are employed to represent different items of information and the resulting output wave form utilizes minimum band width.

It is a still further feature of this invention to provide an improved modulation device utilizing different discrete frequencies to represent different items of information with the change from one frequency to another in the output wave taking place at the zero signal level.

The foregoing and other objects, features and advantages of the invention will be apparent from the following more particular description of a preferred embodiment of the invention, as illustrated in the accompanying drawings.

When transmitting digital data over transmission lines, it is desirable to put the information in a form that requires the least amount of band width which is consistent with reliable retrieval of the information at its destination. If T is the duration of a signal representing an item of information, then the data frequency W may be expressed as $$W=\frac{2\pi}{T}$$

and the minimum band width required is $W/2$ in the idealized case. The objective is to approach this idealized case as close as possible in practice.

In the subsequent description illustrating the principles of this invention, two discrete frequencies are employed to represent binary information, but it is to be understood that information in other systems of enumeration may be represented by using more than two frequencies. The binary system of enumeration is employed for illustrative purposes because of its simplicity, involving the use of only two frequencies.

Figure 1:
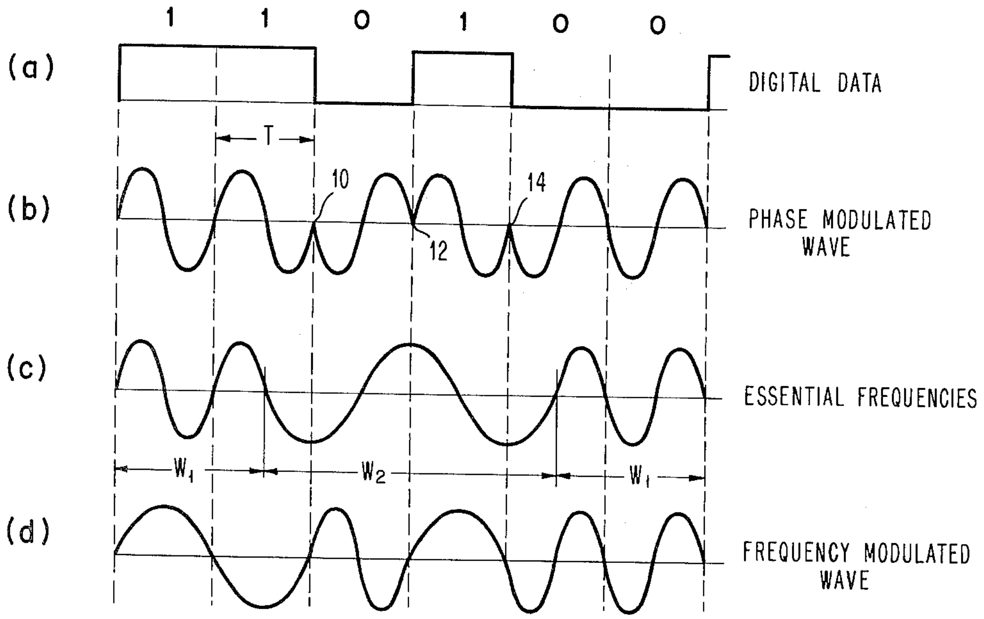
FIG. 1 shows curves which are helpful in illustrating the invention.

If binary information is represented in digital form, it is convenient to refer to different discrete levels associated with each of the binary values. The binary values of 1 and 0 are illustrated by the wave in FIG. 1*a*, where the wave has an upper level which represents binary 1 and a lower level which represents binary 0 denoting a non-return to zero mode (NRZ). If, for example, phase modulation is employed to represent digital data, the binary information illustrated in FIG. 1*a* will produce a resultant wave illustrated in FIG. 1*b*. Note the phase reversals which take place at points 10, 12 and 14 on the wave in FIG. 1*b*. Where binary information is transmitted over a narrow band, it is convenient to speak of an essential frequency associated with each of the binary values. The essential frequencies are illustrated in FIG. 1*c* for the phase modulated wave in FIG. 1*b*. The essential frequency associated with unchanging values, such as two or more zeros or two or more ones, is $W_1=W$ and the frequency associated with change-overs from binary 1 to binary 0 or from binary 0 to binary 1 is $$W_2=\frac{W}{2}$$

as readily seen in FIG. 1*c*. It is seen in FIG. 1*b* that in the time region in which a change-over occurs, from a binary 1 to a binary 0 or a binary 0 to a binary 1, higher frequencies are contained in the signal in addition to the essential frequency $$W_2=\frac{W}{2}$$

These higher frequency components are not necessary for the transmission of information. There is shown in FIG. 1*d* a frequency modulated wave representing the binary information illustrated in FIG. 1*a*. If it is assumed that $W_1=W$ and $$W_2=\frac{W}{2}$$

the waveform shown in FIG. 1*d* results. The required frequency spectrum of a signal of this type is not larger than 1.3 w. for the worse case (i.e. of alternating ones and zeros), if it is understood that each sine wave section or portion appears in the proper phase as indicated in FIG. 1*d* with a negative excursion followed by a positive excursion and a positive excursion followed by a negative excursion. A circuit for producing a frequency modulated wave of a type illustrated in FIG. 1*d* is shown in FIG. 2.

Figure 2:
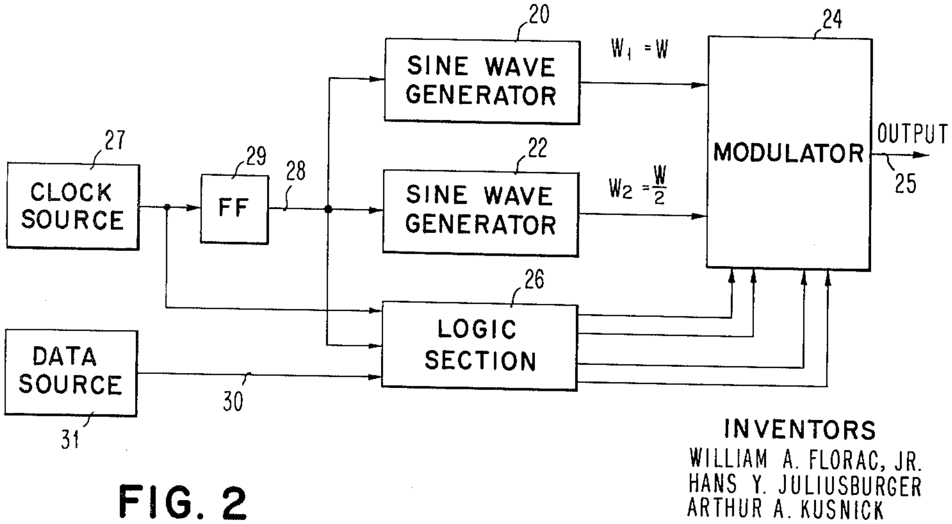
FIG. 2 is a block diagram of the invention.

Referring next to FIG. 2, a sine wave generator 20 and a sine wave generator 22 are connected to a modulator 24. A logic section 26 is connected to the modulator 24. Clock signals from a source 27 are applied to a line 28 through a flip-flop 29. The line 28 is connected to the sine wave generators 20 and 22 and the logic section 26, while the source 27 is directly connected to the logic section 26. Signals representing data are applied on a line 30 from a data source 31 to the logic section 26. The sine wave generator 20 generates a signal having a frequency $W_1$ equal to W and the sine wave generator 22 generates a signal having a frequency $W_2$ which is equal to $W/2$. The two sine waves $W_1$ and $W_2$ are continuously generated in synchronism with the data signals from source 31 and the clock signals from source 27. The two sine waves are applied to the modulator 24. The original wave and a phase shifted original sine wave (sine+180°), its complement, for each of the two frequencies are available in the modulator as outputs therefrom. The function of the logic section 26 is to select the proper frequency and the sine wave or its complement wave for that frequency for transmission on the output conductor 25 of the modulator 24 according to the data input signals applied to line 30 from data source 31.

Figure 3:
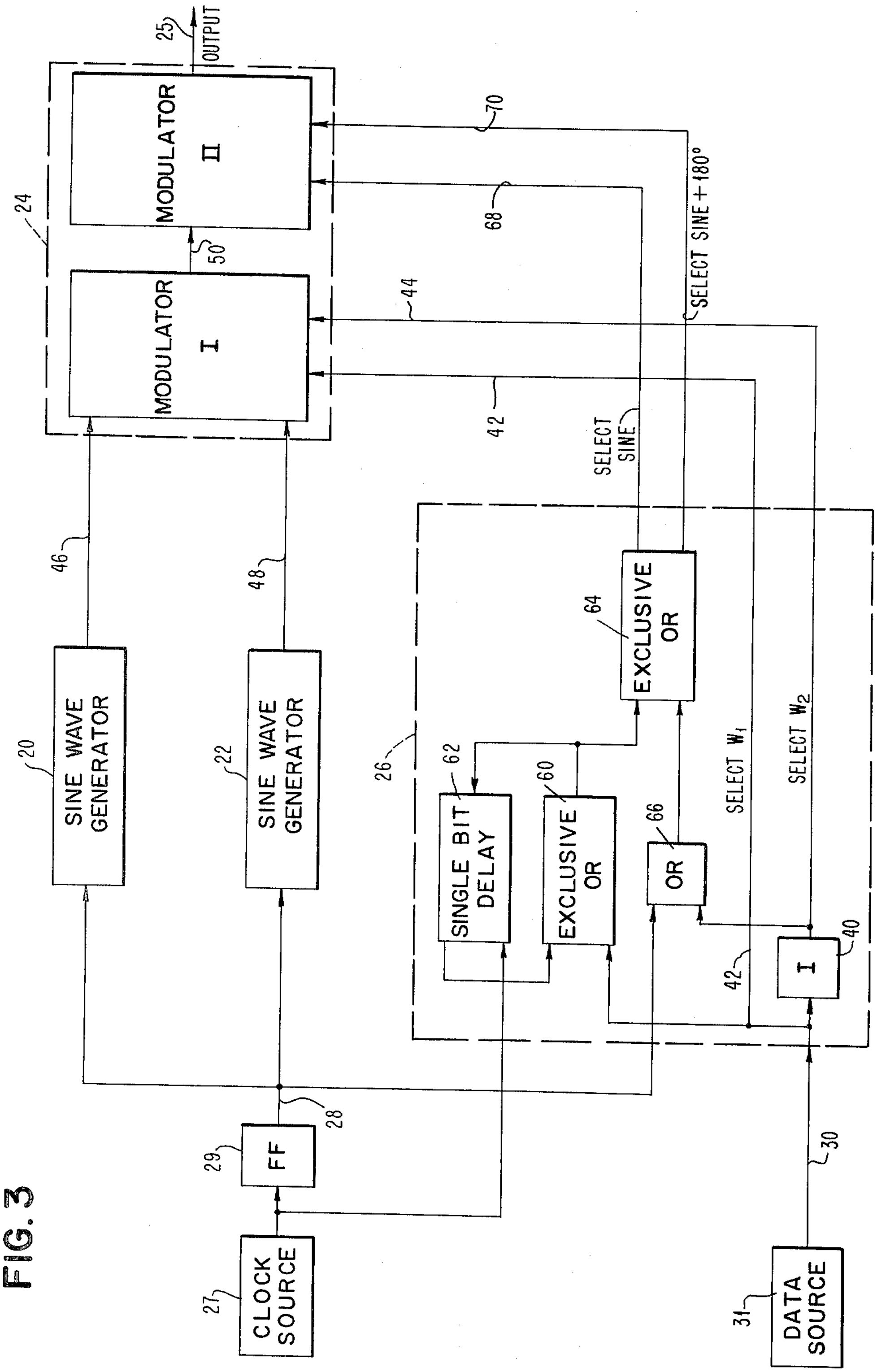
FIG. 3 is a block diagram showing the invention in more detail.

The modulator device illustrated in block form in FIG. 2 is shown in further detail in FIG. 3. Referring to FIG. 3, the modulator 24 is illustrated as being composed of a modulator I and a modulator II. The logic section 26 in FIG. 3 includes an inverter circuit 40. Signals from data source 31 are applied directly to modulator I via a data input line 42 and are also applied, in inverted form, via a line 44 by means of the inverter circuit 40. Signals on the line 42 select frequency $W_1$ and signals on the line 44 select frequency $W_2$. Frequency $W_1$ is supplied by the sine wave generator 20 on a line 46 to the modulator I, and the frequency $W_2$ is supplied by the sine wave generator 22 on a line 48 to the modulator I. The modulator I supplies sine wave signals of the frequency $W_1$ or the frequency $W_2$ on a line 50 to the modulator II.

The logic section 26 in FIG. 3 includes an exclusive OR circuit 60 which receives signals from the line 42. The output of the exclusive OR 60 is coupled to a single bit delay circuit 62 which has its output coupled to the input of the exclusive OR circuit 60. The output of the exclusive OR circuit 60 is also coupled to an exclusive OR circuit 64. The exclusive OR circuit 64 receives signals from an OR circuit 66 which in turn receives signals from the inverter circuit 40 on the line 44 and the clock signals on the line 28. The output signals from the exclusive OR circuit 64 are supplied on lines 68 and 70 to the modulator II. Signals on the line 68 select the original sine wave output on line 50 from the modulator I, and signals on the line 70 select the complement of the sine wave output on line 50 from the modulator I. Accordingly, it is seen that the data input from line 30 operates the modulator I to select frequency $W_1$ or $W_2$, and the output of the exclusive OR circuit 64 operates the modulator II to select the original sine wave of the selected frequency or the complement of the original sine wave. The exclusive OR circuit 64 is operated by the exclusive OR circuit 60 and the OR circuit 66 in a manner to insure that the frequency modulated output wave always has a negative excursion following a positive excursion and a positive excursion following a negative excursion. The manner in which this function is performed best may be understood with reference to FIG. 4 which illustrates in a greater detail the circuits of FIG. 3.

Figure 4:
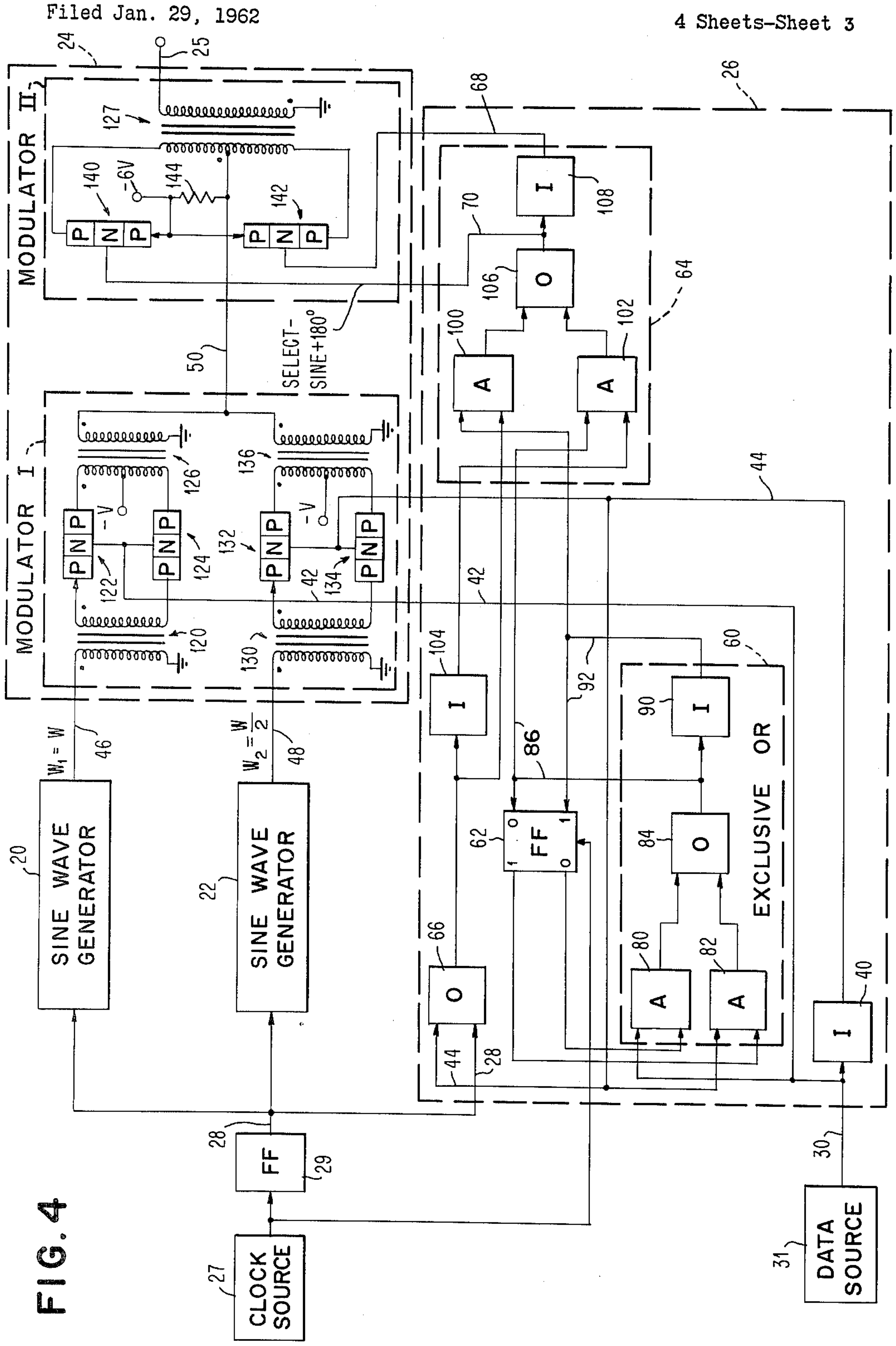
FIG. 4 is a block diagram showing the circuits of FIG. 3 in greater detail.

Referring next to FIG. 4, the data from source 31 applied to line 30 is directly transferred via the line 42 to an AND circuit 80 and to an inverter 40. The output of the inverter 40 is connected via the line 44 to an AND circuit 82. The outputs of the AND circuits 80 and 82 are connected to an OR circuit 84, and an output 86 of the OR circuit 84 is connected to the "0" input side of a flip-flop 62. The output 86 of the OR circuit 84 is also coupled to an inverter 90 the output of which is coupled via line 92 to the "1" input side of the flip-flop 62. The flip-flop 62 constitutes the single bit delay circuit 62 shown in block form in FIG. 3. The "1" output side of the flip-flop 62 in FIG. 4 is connected to the AND circuit 82 and the "0" output side of the flip-flop 62 is connected to the AND circuit 80.

The output of the inverter 90 is connected to an AND circuit 100, and the output of the OR circuit 84 is connected to an AND circuit 102. The OR circuit 66 has an output which is connected to the AND circuit 100, and the output of the OR circuit 66 is also connected to an inverter 104. The output of the inverter 104 is connected to the AND circuit 102. The output lines of the AND circuits 100 and 102 are connected to an OR circuit 106. The output of the OR circuit 106 is connected by the line 70 to the modulator II. The output of the OR circuit 106 is connected also to an inverter 108, and its output is connected by the line 68 to the modulator II.

It is recalled from the description of FIGS. 2 and 3 that the sine wave generator 20 supplies frequency $W_1$ to the modulator I, and the sine wave generator 22 supplies frequency $W_2$ to the modulator I. The signals with frequency $W_1$ from the sine wave generator 20 are coupled through a transformer 120 to the emitters of transistors 122 and 124. The collectors of the transistors 122 and 124 are connected through a transformer 126 and the line 50 to the centertap of the primary winding of a transformer 127 in the modulator II. The base electrodes of the transistors 122 and 124 are connected to the line 42, and negative signals on the line 42 operate the transistors 122 and 124 to the conductive state. Positive signals on the line 42 operate the transistors 122 and 124 to the non-conductive state.

Signals with frequency $W_2$ from the sine wave generator 22 are conducted along the line 48 through a transformer 130 to the emitter electrodes of transistors 132 and 134. The collector electrodes of the transistors 132 and 134 are connected through a transformer 136 and the line 50 to the centertap of the primary winding of the transformer 127 in modulator II. The base electrodes of the transistors 132 and 134 are connected to the line 44. Negative signals on the line 44 operate the transistors 132 and 134 to the conductive state, and positive signals on the line 44 operate these transistors to the non-conductive state.

Figure 5:
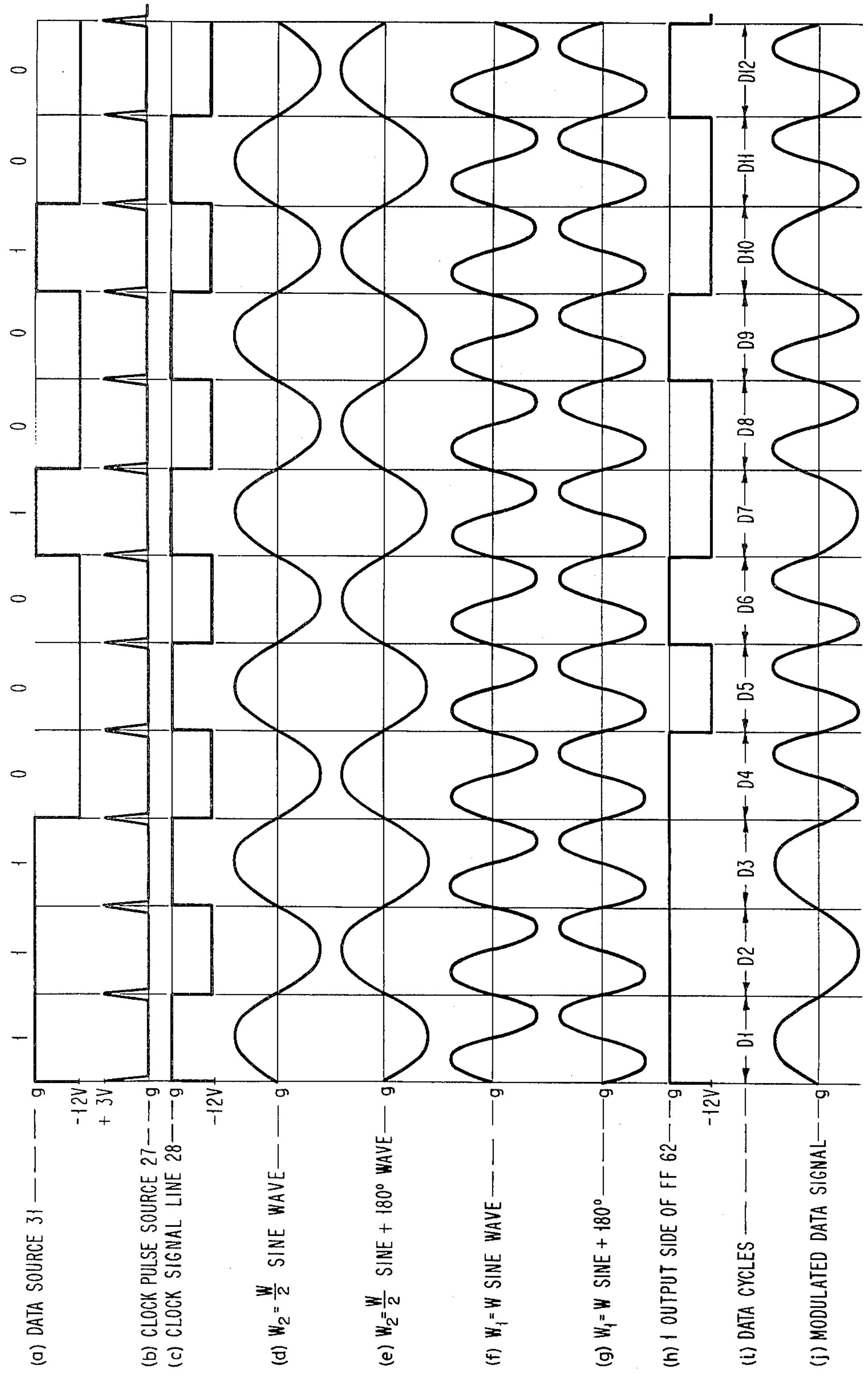
FIG. 5 is a set of waveforms which help to clarify the operation of the circuits in FIG. 4.

Since the lines 42 and 44 are derived from line 30 and inverter 40 respectively, one line is always more positive than the other. For purposes of illustration the more positive level is arbitrarily assumed to be ground level, and the more negative level is arbitrarily selected as −12 volts. When the data input on line 30 is in the binary 0 state, the signal on line 42 is at ground level, and the output signal from the inverter 40 is at −12 volts. The −12 volts signal on the line 44 operates the transistors 132 and 134 to their conductive state, and signals is a ground level applied both to the inverter 104 and the AND circuit 100. The output of the inverter 104 is a −12 volt signal which is applied to the AND circuit 102. The two ground signal levels applied to the AND circuit 100 produced an output level of −12 volts which is applied to the OR circuit 106. The two input levels of −12 volts each applied to the AND circuit 102 produce an output level of ground which is applied to the OR circuit 106. The −12 volt level and the ground level applied to the OR circuit 106 produce an output level at ground on the line 70, and the ground level is inverted in the inverter 108 and applied as a −12 volt signal on the line 68. The ground level on the line 70 renders the transistor 140 non-conductive; whereas, the −12 volt level on the line 68 renders the transistor 142 conductive. This causes the modulator II to pass the sine wave of the selected frequency $W_2$ to the output line 25 for the duration of data cycle one as illustrated in FIG. 5*j*.

It should be pointed out at this time that the AND circuits and the OR circuits employed in FIG. 4 respond to two input signals and provide a single output signal as indicated in Table 1 below:

*Table 1*

| Inputs | | Outputs |
|---|---|---|
| A | B | C |
| G | G | −12 |
| G | −12 | G |
| −12 | G | G |
| −12 | −12 | G |

It should be noted that the output of the AND and OR circuits is inverted. For example, if two ground signal levels are applied to an AND circuit, the output therefrom is a −12 volt signal, and if unlike signals are applied to an AND circuit, the resulting output signal is ground level. In the case of an OR circuit, if both input levels are unlike or if both input levels are −12 volts, the resulting output level is a ground level. If both input levels to an OR circuit are ground levels, the resulting output level is −12 volts. The circuits for performing the AND function and the OR function in FIG. 4 are described in detail hereinafter.

At the commencement of the second data cycle D2 as shown in FIG. 5*i*, a positive data signal as shown in FIG. 5*a* arrives on the line 30 with a ground level being applied to the line 42 and a −12 volt level being applied to the line 44 through inverter 40. At the commencement of data cycle D2, a negative signal level is applied to the "0" input side of the flip-flop 62 while a ground level is applied to the "1" input side of this flip-flop. Simultaneously a pulse from source 27 is supplied the flip-flop 62. The ground level on the "1" input side is effective to set the flip-flop 62 to its "1" state, but the flip-flop 62, being in the "1" state already, remains unchanged with a ground level appearing on its "1" output line and a −12 volt level appearing on its "0" output line. The OR circuit 66 continues to receive a −12 volt level from the output side of the inverter 40 on the line 44, but the clock pulse on the line 28 changes to a −12 volt level at the beginning of data cycle D2. The two −12 volt levels applied to the OR circuit 66 produce an output level of ground, this level being the same as the output level in data cycle D1. It is seen therefore that the input levels to the exclusive OR circuit 60 are the same in data cycle D2 as in data cycle D1, and the inputs to the exclusive OR circuit 64 are the same in data cycle D2 as they were in data cycle D1. Therefore, the output levels of the exclusive OR circuit 64 remain unchanged with the transistor 142 being rendered conductive and the transistor 140 being rendered non-conductive. Accordingly, the sine of the selected wave $W_2$ appears on the output conductor 25 during the data cycles D2 as illustrated in FIG. 5*j*.

At the beginning of data cycle D3 a positive level is applied to the line 30 in FIG. 4 as indicated in FIG. 5*a*. The data level represents a binary 1. The ground signal level on line 92 is effective to set the flip-flop 62 to its "1" state. However, the flip-flop 62 being in the "1" state at this time remains unchanged. The −12 volt signal on the line 44 to the OR circuit 66 in FIG. 4 remains unchanged, but the signal level of the clock wave on line 28 changes from a −12 volt level to a ground level. However, the output level of the OR circuit 66 remains at ground as it did during data cycle D2. Accordingly, the input signals to the exclusive OR circuit 64 remain unchanged from what they were during data cycle D2, and it is readily seen that the sine wave of the selected frequency $W_2$ is supplied to the output line 25 of the modulator II during data cycle D3.

At the beginning of data cycle D4 a negative level is applied to the line 30 in FIG. 4, and this level represents a binary zero. This causes a ground level to appear on the line 44 and a −12 volt level to appear on the line 42. This causes selection of the frequency $W_1$ in the modulator I. The −12 volt signal level on the line 42 is applied to the AND circuit 80 in FIG. 4, and the ground signal level on the line 44 is applied to the AND circuit 82. The signals applied to flip-flop 62 at the beginning of data cycle D4 are −12 volts on line 86 and ground level on line 92. The ground level supplied to the "1" input side of the flip-flop 62 is effective to set the flip-flop to the "1" state, but since this flip-flop is in the "1" state already, it remains unchanged. Therefore, the flip-flop 62 supplies a ground level to the AND circuit 82 and a −12 volt level to the AND circuit 80. The two −12 volt levels supplied to the AND circuit 80 produce an output level of ground from the AND circuit 80 to the OR circuit 84. The two ground levels supplied to the AND circuit 82 produces a −12 volt level at the output thereof which is applied to the OR circuit 84. The ground level and the −12 volt level applied to the OR circuit 84 produce a ground level at the output thereof which is applied to the line 86 and the AND circuit 102. The level from the inverter 90 is a −12 volt level which is applied to the AND circuit 100 and the line 92. The OR circuit 66 receives a ground level on the line 44 from the inverter 40 and a −12 volt level on the line 28 from the clock wave. The −12 volt level and the ground level applied to the OR circuit 66 produces at the output thereof a ground level which is applied to the AND circuit 100. The output of the inverter 104 is a −12 volt level which is applied to the AND circuit 102. The −12 volt level and the ground level applied to the AND circuit 100 produces at the output thereof a ground level which is applied to the OR circuit 106. The ground level and the −12 volt level applied to the AND circuit 102 produces at the output thereof a ground level which is applied to the OR circuit 106. The output level of the OR circuit 106 is a −12 volt level which is applied to the base of the transistor 140, and the output level of the inverter 108 is a ground level which is applied to the base of the transistor 142. Accordingly, the transistor 140 of modulator II is operated to pass the complemented sine wave of the selected frequency $W_1$ to the output line 25 in FIG. 4. It is readily seen that during data cycle D4 the output wave $W_1$ in FIG. 5*j* is the complemented sine wave $W_1$ in FIG. 5*g*.

At the beginning of data period D5 a negative level, representing a binary zero, is applied to the data line 30. The flip-flop 62 receives a ground level signal on the "0" input side at the beginning of data period D5, and this changes the flip-flop 62 from the "1" state to the "0" state. At the beginning of data period D5 the clock signal on line 28 changes from a minus level to a ground level. If these changes are traced through the circuits in FIG. 4, it is seen that the output levels from the exclusive OR circuit 64 nevertheless remain unchanged, and the complemented sine wave of the selected frequency $W_1$ is supplied to the output line 25 in FIG. 4.

with frequency $W_2$ from the sine wave generator 22 are passed through the transformer 130, the transistors 132 and 134 and the transformer 136 to the output line 50. The signals on the output line 50 are supplied to the modulator II. The ground level on the line 42 from the input side of the inverter 40 is supplied to the base electrode of the transistors 122 and 124, and it operates these transistors to the non-conductive state. Accordingly, the signals having a frequency $W_1$ from the sine wave generator 20 are inhibited from reaching the output line 50.

If the data input on line 30 is in the binary 0 state, a ground level signal is supplied on the line 44 from the output of the inverter 40 to the base electrodes of the transistors 132 and 134, and this inhibits the passage of signals to the ouput line 50 with frequency $W_2$ from the sine wave generator 22. The negative level on the line 42 is applied to the base electrodes of the transistors 122 and 124, and this operates these transistors to their conductive state, thereby passing signals with frequency $W_1$ from the sine wave generator 20 to the output line 50. Accordingly, it is seen that whenever the data input is in the binary 1 state, signals with frequency $W_2$ are applied on the output line 50 to the modulator II, and when the data input is in the binary 0 state, signals with frequency $W_1$ from the sine wave generator 20 are supplied on the output line 50 to the modulator II. Accordingly, it is seen that data signals on the line 30 are effectively selecting frequency $W_2$ when a binary 1 is present and frequency $W_1$ when a binary 0 is present.

Signals of the selected frequency are supplied on the line 50 to the centertap of the primary winding of the transformer 127 in the modulator II. The modulator II includes transistors 140 and 142 having their collector electrodes connected to the primary winding of the transformer 127 and their emitter electrodes connected through a resistor 144 to the centertap of the primary winding of the transformer 127. The lines 68 and 70 are connected to the base electrodes of respective transistors 142 and 140. Whenever the line 70 has a negative signal level applied thereto, the transistor 140 is operated to its conductive state, and it passes the phase shifted original wave (sine +180°), the complement wave, of the selected frequency to the output conductor 25. Whenever the line 70 has a negative signal level applied thereto, the line 68 has a positive signal level, and this positive signal operates the transistor 142 to the non-conductive state. Whenever the line 68 carries a negative signal and the line 70 a positive signal, the transistor 142 is operated to its conductive state and the transistor 140 is operated to its non-conductive state. When the transistor 142 is rendered conductive, it passes the sine wave of the selected frequency to the output conductor 25. It is seen therefore that the modulator II is operated by the signals of the line 68 and the line 70 to pass the respective sine wave, or its complement wave, of the selected frequency for the purpose of insuring that a positive signal excursion on the output line 25 is followed by a negative signal excursion and vice versa.

Data signals on line 42 and line 44 are supplied also to the exclusive OR circuit 60, and the output of this exclusive OR circuit together with the signals from the OR circuits 66 and the inverter 104 are supplied to the exclusive OR circuit 64 the output of which operates the modulator II as previously explained. For the purpose of determining whether a selected frequency should have a positive or a negative excursion during a given data period, it is necessary to know whether the excursion of the preceding wave was positive or negative. For this reason the single bit delay circuit 62 receives the output from the exclusive OR 60, delays it one data cycle and presents this data at the output of the flip-flop 62 during the subsequent data period. It is seen therefore that the inputs to the exclusive OR circuit 60 represent the current data from the source 31 in direct form on line 42 and in complement form on line 44, and the preceding data result from the flip-flop 62. The exclusive OR circuit 60 is able therefore to supply proper signals to the exclusive OR circuit 64 for making the proper selection. It is pointed out that clock signals on the line 28 are supplied to the OR circuit 66 and the output of this OR circuit together with the output of the inverter 104 are supplied to the exclusive OR circuit 64. The clock signals supplied to the OR circuit 66 and through it to the exclusive OR 64 are effective to change the selection of the sine wave and its complement wave in the modulator II at the appropriate time, the appropriate time in this instance being the zero or cross-over point of the sine wave or its complement wave.

The operation of the circuit in FIG. 4 may best be understood by referring to the wave forms illustrated by succeeding data cycles D1–D12 in FIG. 5*a* through 5*j*. The sine wave generator 20 in FIG. 4 generates a wave having a frequency $W_1$ which is illustrated in FIG. 5*f*, and the sine wave generator 22 generates a wave having a frequency $W_2$ which is illustrated in FIG. 5*d*. The clock signal on the line 28 in FIG. 4 supplies the driving signal for the sine wave generators 20 and 22, and thereby causes the sine wave generator to be synchronized with the clock signals. The clock signals are illustrated in FIGS. 5*b* and 5*c*. The sine wave generators 20 and 22 derive waveforms $W_1$ and $W_2$ by filtering the second and first harmonic of the clock signal on line 28, respectively. The clock signal in turn is generated by clock source 27, the output of which is illustrated in FIG. 5*b*. The signals from source 27 causes flip-flop 29 to change state every data cycle, thereby producing the signal shown in FIG. 5*c* on line 28. The data cycles D1–D12, are illustrated in FIG. 5*i* and they coincide with the clock pulse intervals from source 27 as illustrated in FIG. 5*b*. The output signals of the exclusive OR circuit 60 in FIG. 4 operate the delay flip-flop 62 to provide signals on its one output side as indicated in FIG. 5*h*. The resulting frequency modulated output wave on the line 25 in FIG. 4 has the form illustrated in FIG. 5*j*.

For the purpose of illustrating the operation of the circuits shown in FIG. 4, let it be assumed that data signals such as indicated in FIG. 5*a* are applied to the line 30 in FIG. 4. Let it be assumed further that the flip-flop 62 in FIG. 4 is set at the beginning of data cycle D1 to its one state with a ground level appearing on the "1" output side, that the clock signal on line 28 at the beginning of data cycle D1 is at its most positive or ground level, and that the sine wave generators 20 and 22 are in synchronism as illustrated in FIGS. 5*f* and 5*d*.

The data signals on the line 30 in FIG. 4 represent a binary 1 when they are at ground level and a binary 0 when they are negative. As a result, inverter 40 causes a negative level to appear on the line 44, thereby selecting and passing the wave having frequency $W_2$ to the modulator II as earlier explained. This causes one half of an oscillation cycle of the wave $W_2$ to be supplied to the modulator II as illustrated in FIG. 5*d*. The ground level on the line 42 and the −12 volt level from the zero side of the flip-flop 62 are applied to the AND circuit 80, and the output signal from the AND signal 80 to the OR circuit 84 is a ground level. The −12 volt signal on the line 44 and the ground level from the one side of the flip-flop 62 are supplied to the AND circuit 82, and the output of the AND circuit 82 to the OR circuit 84 is a ground level. Thus two ground levels are supplied to the OR circuit 84, and the output level from the OR circuit 84 is a −12 volt signal which is applied to the "0" input of flip-flop 62, the AND circuit 102, and the inverter 90. The output of the inverter 90 is a ground level which is applied to the "1" input of flip-flop 62 and to the AND circuit 100. The −12 volt signal level on the line 44 and the ground signal level of the clock pulse on the line 28 are applied to the OR circuit 66 the output of which During data period D6 the data line 30 remains unchanged, the flip-flop 62 changes from the "0" state to the "1" state, and the clock signal changes from a ground level to a negative 12 volt level. These changes do not alter the output levels of the exclusive OR circuit 64, and the complemented sine of the selected wave $W_1$ is applied to the output line 25 in FIG. 4 during data cycle D6. At the commencement of data cycle D7 a positive data level is applied to the line 30 in FIG. 4, thereby providing a ground level on the line 42 and a −12 volt level on the line 44. The flip-flop 62 changes from the "1" state to the "0" state, and the clock wave changes from the −12 volt level to the ground level. Nevertheless these changes do not change the output levels of the exclusive OR circuit 64 in FIG. 4, and the complemented sine wave of the selected frequency $W_2$ appears on the output line 25 in FIG. 4 during the data cycle D7.

At the beginning of data cycle D8 a negative level is applied to the line 30 in FIG. 4, thereby providing a ground level on the output line 44 and a −12 volt level on the output line 42. The flip-flop 62 in FIG. 4 remains unchanged during data cycle D8, and the clock wave changes from a ground level to a −12 volt level. The output levels of the exclusive OR circuit 64 are changed with −12 volts appearing on the line 68 and the ground level appearing on the line 70. Accordingly, the transistor 142 is rendered conductive, thereby passing the sine wave of the selected frequency $W_1$. During data period D8 the sine wave of the selected wave $W_1$ appears on the output line 25 in FIG. 4 as illustrated in FIG. 5*j*.

During data period D9 the data line 30 remains unchanged, the flip-flop 62 reverses its state, and the clock wave changes from a −12 volt level to a ground level. These changes nevertheless do not change the output signals of the exclusive OR circuit 64 in FIG. 4 and the sine of the selected wave $W_1$ appears on the output line 25 in FIG. 4 as illustrated in FIG. 5*j*.

At the beginning of data period D10 a positive level is applied on line 30, the flip-flop 62 changes its state, and the clock wave changes from a ground level to a −12 volt level. As a result the output levels of the exclusive OR circuit 64 are reversed, a −12 volt level appearing on the line 70 and a ground level appearing on the line 68. Accordingly, the transistor 140 is rendered conductive, thereby passing the complemented sine wave of the selected frequency $W_2$ to the output line 25 in FIG. 4. It is pointed out in FIG. 5 that the frequency modulated output wave illustrated in FIG. 5*j* during data cycle D10 is the complemented sine wave of the selected frequency $W_2$ during this period.

At the beginning of data cycle D11 a negative level is applied on the line 30 thereby providing a −12 volt level on the line 42 and a ground level on the line 44. The flip-flop 62 remains unchanged and continues in the "0" state. The clock pulse changes from a −12 volt level to a ground level. The output levels of the exclusive OR circuit 64 nevertheless remain unchanged, and the complement of the selected wave $W_1$ appears at the output line 25 in FIG. 4 during data cycle D11.

At the beginning of data cycle D12 a negative level is applied to the line 30 in FIG. 4. The flip-flop 62 changes from the "0" to the "1" state, and the clock wave changes from a ground level to a −12 volt level. These changes do not alter the output levels of the exclusive OR circuit 64 and the complemented sine of the selected wave $W_1$ is applied to the output line 25 in FIG. 4 as indicated in FIG. 5*j*.

It is pointed out that the frequency modulated output wave in FIG. 5*j* is a continuous, smooth wave wherein the binary information represented by the data signals in FIG. 5*a* are presented as frequency modulated signals with positive excursions followed by negative excursions. It is pointed out that a binary one may be represented by either a positive or negative half wave of frequency $W_2$, selecting either the original or the complemented sine wave, and a binary zero may be represented by a full cycle of either the sine or complemented sine wave of the frequency $W_1$. In each case whether it is a change from one frequency to the other, the change takes place at the zero voltage level, thereby presenting an output wave which is smooth and continuous.

The foregoing discussion has dealt with the frequencies $W_1$ and $W_2$ where $W_1=W$, and $W_2=W/2$. Other values may be substituted for the frequencies $W_1$ and $W_2$. A further reduction of required band width may be accomplished, for example, if the following values are employed; $W_1=2W/3$ and $W_2=W/2$. An arrangement of this type involves switching from one frequency to another at points other than the zero signal level of the frequencies involved. Where the ratios of the two frequencies employed are 2 to 1, synchronization is more easily accomplished and the switching from one frequency to another may be performed at the zero signal level, a desirable aspect in practice.

The AND, OR and flip-flop circuits illustrated in FIG. 4 may be constructed by reference to chapter 4 of a book entitled "Digital Computer Components, and Circuits," by R. K. Richards, published by D. Van Nostrand Co., Inc., copyrighted in 1957.

While the invention has been particularly shown and described with reference to a preferred embodiment thereof, it will be understood by those skilled in the art that various changes in form and details may be made therein without departing from the spirit and scope of the invention.

What is claimed is:

1. A circuit comprising:

a plurality of wave generators each having a different frequency of oscillation;

a first modulation circuit coupled to receive waves from said generators;

a source of data signals;

switching means coupled to said first modulator circuit and said source of data signals for selecting a predetermined one of said generators;

a second modulator circuit coupled to receive the selected frequency wave from said first modulator circuit, selectively operative to pass the original wave or a phase shifted original wave of the selected frequency wave;

a clock pulse source;

and phase selection means coupled to said second modulation circuit, said source of data signals and said clock pulse source for selectively operating said second modulator circuit to provide an output wave which is always continuous and without abrupt change in slope.

2. A circuit comprising:

a plurality of wave generators each having a different frequency of oscillation;

a first modulator circut coupled to receive waves from said generators;

a source of data signals;

switching means coupled to said first modulator circuit and said source of data signals for selecting a predetermined one of said generators;

a second modulator circuit coupled to receive the selected frequency wave from said first modulator, selectively operative to pass the original wave or a phase shifted wave of the selected frequency wave;

and phase selection means coupled to said second modulator circuit and said source of data signals for selectively operating said second modulator circuit to provide an output wave which is always continuous and without abrupt change in slope.

3. The circuit of claim 2, wherein said second modulator circuit operates to pass the original wave or a complement wave of the selected frequency wave.

4. A modulation circuit comprising:
a plurality of wave generators each having a different frequency of oscillation;
a source of data signals;
first means coupled to said source of data signals and said generators for selecting and passing a predetermined output wave of only one of said generators;
and second means coupled to receive the selected frequency wave from said first means and coupled to said source of data signals, selectively operative to pass the original wave or a phase shifted wave of the selected frequency wave and provide an output waveform which is always continuous and without abrupt change in slope.

5. A modulaton device comprising:
a plurality of wave generators each having a different frequency of oscillation;
a source of data signals;
and a circuit coupled to said generators and said source of data signals including a first means for selecting a predetermined one of said generators and second means for passing only the associated original wave or a phase shifted original wave of the selected generator to provide an output waveform which is always continuous and without abrupt change in slope.

6. A modulation device comprising:
a plurality of wave generators each having a different frequency of oscillation;
a source of data signals;
a circuit coupled to said generators and said source including first means controlled by and responsive to existing data signals for selecting a predetermined one of said generators and second means responsive to existing data signals and delayed preceding data signals from said source for passing only the original associated wave or a phase shifted original wave of the selected generator to provide an output waveform which is always continuous and without abrupt change in slope.

7. A modulation circuit comprising:
a plurality of wave generators each having a different frequency of oscillation;
a source of data signals;
first means coupled to said generators and said source responsive to data signals for selecting a predetermined one of said generators;
second means coupled to receive the selected frequency wave from said first means and coupled to said source, responsive to and controlled by existing data signals and preceding data signals from said source, for passing the original wave or a phase shifted original wave of the selected frequency wave to provide an output waveform which is always continuous and without abrupt change in slope.

8. A cyclicly operated data modulation circuit comprising:
a plurality of wave generators each having a different frequency of oscillation;
a data source;
first means coupled to said generators and said data source for enabling a predetermined one of said generators;
second means for storing a logical result of signals from said data source in one cycle of operation;
third means including said second means responsive to and controlled by signals from said data source in a succeeding cycle of operation and the result stored in said one cycle of operation for selectively passing the original wave provided by said enabled generator and the original wave displaced by a predetermined angle to provide an output waveform which is always continuous and without abrupt change in slope.

9. A circuit comprising:
a plurality of wave generators, each having a different frequency of oscillation;
a source of data signals;
switching means connected to receive the waves from said generators and operably controlled by said data signals to transmit a selected one of said waves;
and phase selection means connected to receive said selected wave and operable to provide an output wave which is either the selected wave or a phase shifted component thereof and which is continuous and without abrupt change in slope.

10. A circuit comprising:
a plurality of wave generators, each having a different frequency of oscillation;
a source of data signals;
switching means connected to receive the waves from said generators and operably controlled by said data signals to transmit a selected one of said waves;
and phase selection means connected to receive said selected wave and operably controlled by said data signals to transmit an output wave which is either the selected wave or a phase shifted component thereof and which is continuous and without abrupt change in slope.

11. A circuit comprising:
a plurality of wave generators, each having a different frequency of oscillation;
a source of data signals;
circuit means coupled to receive data signals and operable to provide control signals;
switching means connected to receive the waves from said generators and operably controlled by one of said control signals to transmit a selected one of said waves;
and phase selection means connected to receive said selected wave and operably controlled by another one of said control signals to transmit an output wave which is either the selected wave or a phase shifted component thereof and which is continuous and without abrupt change in slope.

References Cited by the Examiner

UNITED STATES PATENTS

| | | | |
|---|---|---|---|
| 2,788,391 | 4/1957 | Rudolph | 178—66 |
| 3,102,238 | 8/1963 | Bosen | 178—66 |
| 3,121,197 | 2/1964 | Irland | 178—66 |

DAVID G. REDINBAUGH, *Primary Examiner.*